(12) United States Patent
Tang et al.

(10) Patent No.: US 8,665,392 B2
(45) Date of Patent: Mar. 4, 2014

(54) LCD MODULE AND LCD DEVICE

(75) Inventors: Guofu Tang, Shenzhen (CN);
Shihhsiang Chen, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 23 days.

(21) Appl. No.: 13/576,503

(22) PCT Filed: Jun. 14, 2012

(86) PCT No.: PCT/CN2012/076927
§ 371 (c)(1),
(2), (4) Date: Aug. 1, 2012

(87) PCT Pub. No.: WO2013/181863
PCT Pub. Date: Dec. 12, 2013

(65) Prior Publication Data
US 2013/0329160 A1    Dec. 12, 2013

(30) Foreign Application Priority Data

Jun. 8, 2012 (CN) .............................. 2012 1 087780

(51) Int. Cl.
*G02F 1/1333* (2006.01)
(52) U.S. Cl.
USPC .......................................................... 349/58
(58) Field of Classification Search
USPC .......................................................... 349/58
See application file for complete search history.

(56) References Cited

U.S. PATENT DOCUMENTS

2006/0209226 A1    9/2006   Chung

FOREIGN PATENT DOCUMENTS

| CN | 1677185 A | 10/2005 |
|----|-----------|---------|
| CN | 1244841 C | 3/2006 |
| CN | 101169538 A | 4/2008 |
| CN | 102346509 A | 2/2012 |
| CN | 102608788 A | 7/2012 |

OTHER PUBLICATIONS

Liu Yali, the International Searching Authority written comments, Mar. 2013, CN.

*Primary Examiner* — Phu Vu
(74) *Attorney, Agent, or Firm* — IPro, Inc.; Na Xu (57) ABSTRACT

The invention relates to the field of LCDs, and more particularly to an LCD module and an LCD device. The LCD module includes a front frame, and a backplane. The front frame includes a vertical wall, and the backplane includes a horizontal wall, and a vertical wall. The vertical wall of the front frame is vertically aligned with the vertical wall of the backplane. Because the frame of the conventional LCD module is already made very narrow, the space for further narrowing the frame width is limited; the single edge of the frame of the LCD module is narrowed by a wall thickness of the front frame or the backplane because the vertical wall of the front frame of the LCD module of the invention is conventionally aligned with the vertical wall of the backplane, and then an LCD module with a narrower frame is obtained.

19 Claims, 6 Drawing Sheets

LCD MODULE AND LCD DEVICE

TECHNICAL FIELD

The invention relates to the field of liquid crystal displays (LCDs), and more particularly to an LCD module and an LCD device.

BACKGROUND

Figure 1:
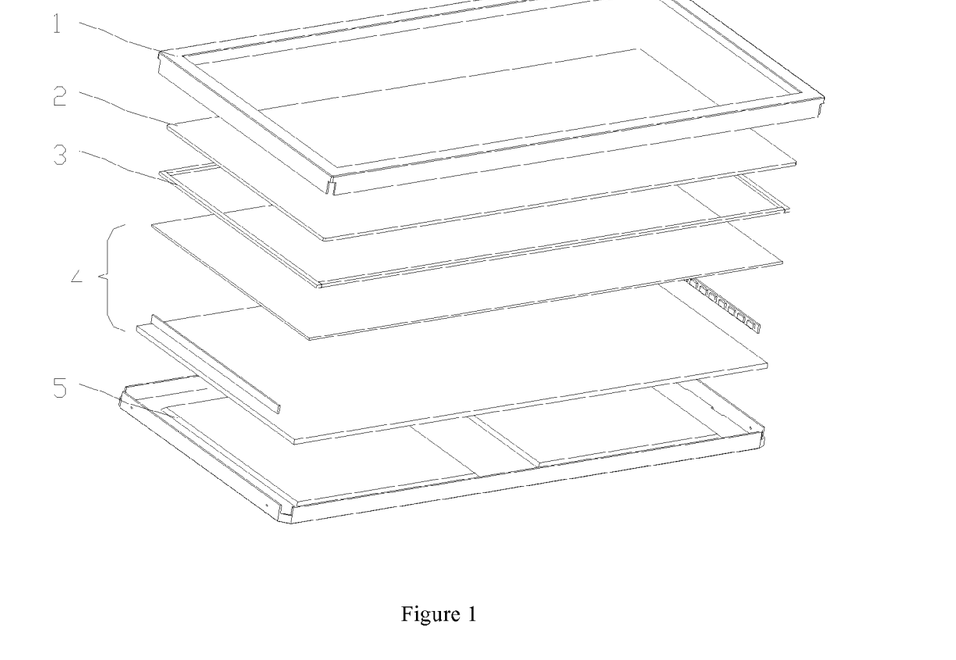
FIG. 1 is a structure diagram of a disassembly diagram of a conventional LCD module.

As shown in FIG. 1, conventional LCD devices such as LCD, LCD television all include an LCD module. The LCD module generally includes a front frame 1, an LCD panel 2, a middle frame 3, a backlight module 4, a backplane 5 and the like. The backlight module 4 includes an optical film, a light guide panel (LGP), a lightbar and the like. Wherein, the front frame 1, the middle frame 3 and the backplane 5 respectively have different functions; the front frame 1 is mainly used for fixing the LCD panel 2 and preventing the LCD panel 2 from escaping, the middle frame 3 is mainly used for bearing the LCD panel 2 and shielding partial backlight module 4 from light leakage, and the backplane 5 is mainly used for bearing and containing the optical film, the LGP, the lightbar and the like and ensuring the planeness of the backlight module 4.

Figure 2:
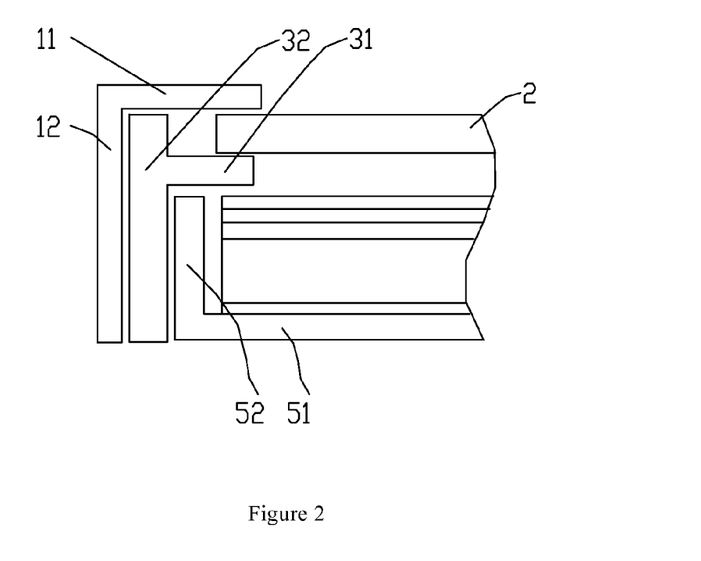
FIG. 2 is an assembly diagram of a conventional LCD module.
Figure 3:
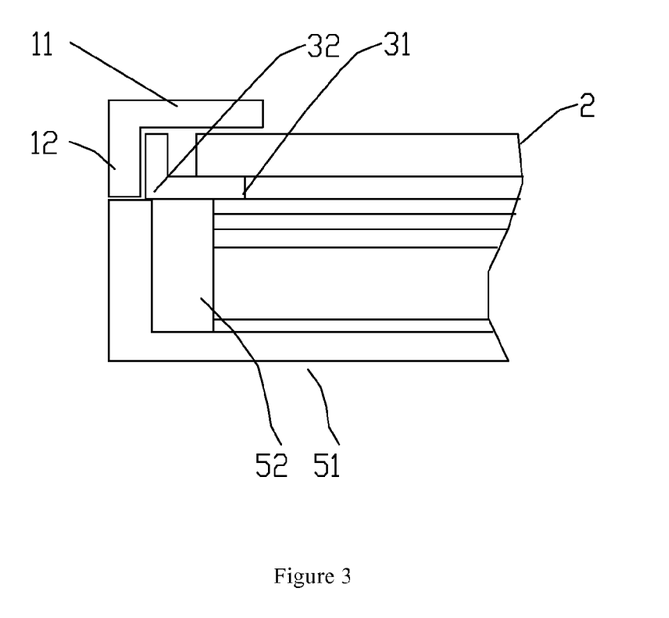
FIG. 3 is an assembly diagram of a first example of an LCD module of the invention.

The outside dimensions of the front frame, the middle frame and the backplane of the conventional LCD module are different. As shown in FIG. 2, the outside dimension of the backplane is the smallest, the outside dimension of the middle frame is larger, and the outside dimension of the front frame is the largest. The front frame, the middle frame and the backplane are assembled and then tightened by clamping hooks or screws. The LCD module of the structure has high strength. However, because the side walls of the front frame, the middle frame and the backplane are superimposed, the frame of the LCD module cannot be further narrowed.

SUMMARY

In view of the above-described problems, the aim of the invention is to provide an LCD module and an LCD device thereof with a narrower frame.

A first technical scheme of the invention is that: an LCD module comprises a front frame, and a backplane. The front frame comprises a vertical wall, and the backplane comprises a horizontal wall and a vertical wall. The vertical wall of the front frame is vertically aligned with the vertical wall of the backplane. The LCD module further comprises a middle frame. The middle frame comprises a horizontal wall, and a vertical wall. The vertical wall of the middle frame is positioned inside the vertical walls of the front frame and the backplane. The upper end surface of the vertical wall of the backplane is provided with a convex lug, the root width of the convex lug is less than the top width of the convex lug, the vertical wall of the front frame is correspondingly provided with a notch matched with the convex lug, the mouth width of the notch is less than the bottom width of the notch, and the convex lug is fixed in the notch, thereby fixing the backplane and the front frame. The outer wall of the vertical wall of the middle frame is provided with a protrusion, the vertical wall of the front frame is correspondingly provided with a through hole, and the protrusion is fixed in the through hole. The front frame is of a separate structure, and is joined by four frame edge members. The vertical wall at the joint of two adjacent frame edge members is provided with a through hole, and a screw used for fixing penetrates through the through hole and fixes the adjacent frame members. Of the through holes in the vertical walls at each joint of the adjacent frame members, the outside through hole is of a closed structure, and the inside through hole is of an open U-shaped structure. The side face of the LCD module is further provided with a reinforcing adhesive tape.

A second technical scheme of the invention is that: an LCD module comprises a front frame, and a backplane. The front frame comprises a vertical wall, and the backplane comprises a horizontal wall and a vertical wall. The vertical wall of the front frame is vertically aligned with the vertical wall of the backplane.

Preferably, the LCD module further comprises a middle frame. The middle frame comprises a horizontal wall, and a vertical wall. The vertical wall of the middle frame is positioned inside the vertical walls of the front frame and the backplane.

Preferably, the LCD module further comprises a middle frame. The middle frame comprises a horizontal wall, and a vertical wall. The vertical wall of the front frame is vertically aligned with the vertical wall of the middle frame. Thus, the single edge of the frame of the LCD module is narrowed by a thickness of the vertical wall of the middle frame on the basis of being narrowed by a wall thickness of the front frame or the backplane, thereby obtaining the LCD module with a narrower frame.

Preferably, the upper end surface of the vertical wall of the backplane is provided with a convex lug, the root width of the convex lug is less than that of the top width of the convex lug, the vertical wall of the front frame is correspondingly provided with a notch matched with the convex lug, the mouth width of the notch is less than the bottom width of the notch, and the convex lug is fixed in the notch, thereby fixing the backplane and the front frame. Because the conventional front frame, middle frame and backplane are assembled and then tightened by clamping hooks or screws on the side face, all these fixing structures can add the frame width of the LCD module; because the front frame and the backplane of the invention are fixed and connected by the connecting structures on the vertical walls, the frame width of the LCD module cannot be added.

Preferably, the lower end surface of the vertical wall of the front frame is provided with a convex lug, and the root width of the convex lug is less than that of the top width of the convex lug; the vertical wall of the backplane is correspondingly provided with a notch matched with the convex lug, the mouth width of the notch is less than the bottom width of the notch, and the convex lug is fixed in the notch, thereby fixing the backplane and the front frame. In the scheme, only by simply exchanging the position of the convex lug with that of the notch, the same aim of the invention can be achieved, and the same advantages can be obtained.

Preferably, the outer wall of the vertical wall of middle frame is provided with a protrusion, the vertical wall of the front frame is correspondingly provided with a through hole, and the protrusion is fixed in the through hole. Thus, the middle frame is integratedly connected with the front frame, thereby increasing the overall strength of the LCD module.

Preferably, the front frame is of a separate structure, and is joined by four frame edge members. Because the protrusion of the vertical wall of the middle frame should be inserted in the through hole of the front frame, to facilitate the assembly of the front frame, the front frame is specially designed into a separate structure.

The vertical wall at the joint of two adjacent frame edge members is provided with a through hole, and the screw used for fixing penetrates through the through hole and then fixes the adjacent frame members. Of the through holes in the vertical walls at each joint of adjacent frame members, the outside through hole is of a closed structure, and the inside through hole is of an open U-shaped structure.

Preferably, the side face of the LCD module is further provided with a reinforcing adhesive tape, thereby further increasing the overall strength of the LCD module.

The invention further provides a third technical scheme: an LCD device comprises the LCD module mentioned above.

The vertical alignment of the two vertical walls of the invention refers that the inner wall of the vertical wall with thinner wall thickness does not exceed the inner wall of another vertical wall, and the outer wall thereof does not exceed the outer wall of another vertical wall as well.

Advantages of the invention are summarized below: because the frame of the conventional LCD module is already made very narrow, the space for further narrowing the frame width is limited; the single edge of the frame of the LCD module is narrowed by a wall thickness of the front frame or the backplane because the vertical wall of the front frame of the LCD module of the invention is vertically aligned with the vertical wall of the backplane, and then an LCD module with a narrower frame is obtained.

Legends: 1. front frame; 11. horizontal wall; 12. vertical wall; 13. notch; 14. through hole; 15. frame edge member; 2. LCD panel; 3. middle frame; 31. horizontal wall; 32. vertical wall; 33. protrusion; 4. backlight module; 5. backplane. 51. horizontal wall; 52. vertical wall; 53. convex lug; 6. screw; 7. adhesive tape.

DETAILED DESCRIPTION

The invention provides an LCD device, comprising an LCD module. FIGS. 3 to 9 show a first example of the LCD module of the invention. The LCD module comprises a front frame 1, and a backplane 5. The front frame 1 comprises a horizontal wall 11, and a vertical wall 12; and the backplane 5 also comprises a horizontal wall 51, and a vertical wall 52. The vertical wall 12 of the front frame 1 is vertically aligned with the vertical wall 52 of the backplane 5. In the example, the LCD module further comprises a middle frame 3. The middle frame 3 comprises a horizontal wall 31, and a vertical wall 32. The vertical wall 32 of the middle frame 3 is positioned inside the vertical wall 12 of the front frame and the vertical wall 52 of the backplane.

Because the frame of the conventional LCD module is already made very narrow, the space for further narrowing the frame width is limited; the single edge of the frame of the LCD module is narrowed by a wall thickness of the front frame 1 or the backplane 5 because the vertical wall 12 of the front frame 1 of the LCD module of the invention is vertically aligned with the vertical wall 52 of the backplane 5, and then an LCD module with a narrower frame is obtained.

Figure 4:
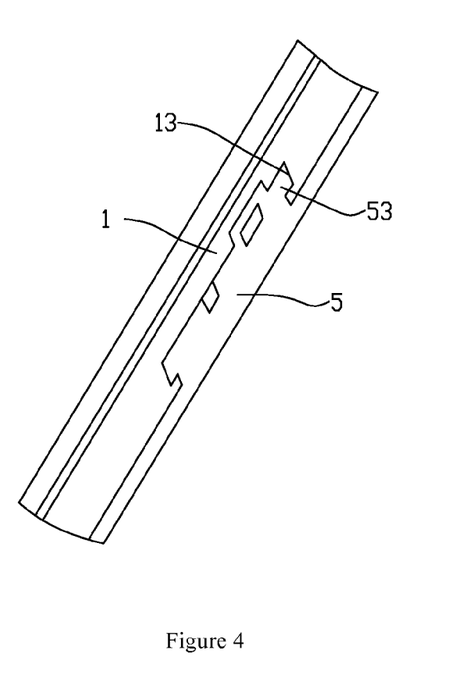
FIG. 4 is a schematic diagram of a connecting structure of a front frame and a backplane of a first example of an LCD module of the invention.
Figure 5:
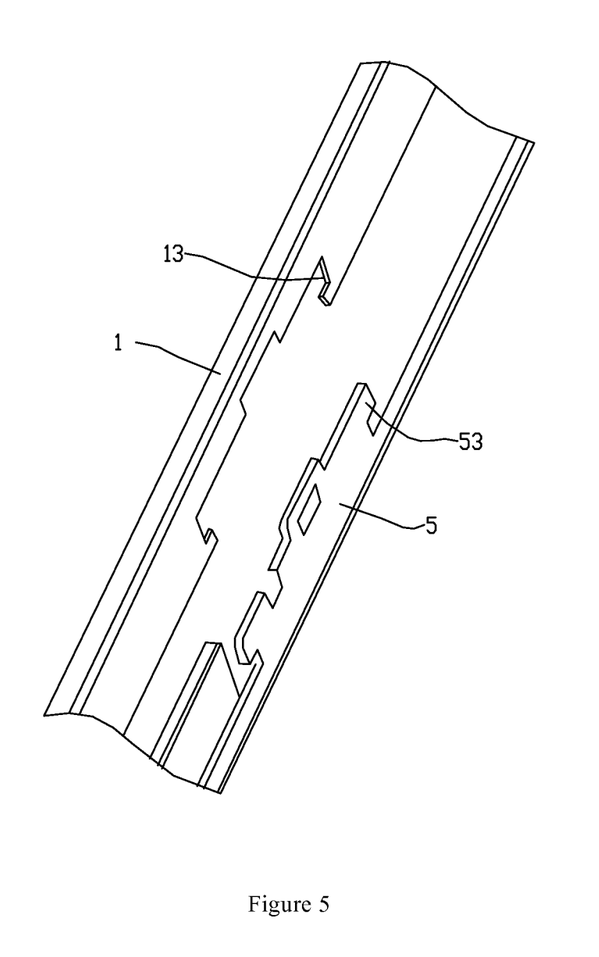
FIG. 5 is a disassembly diagram of a connecting structure of a front frame and a backplane of a first example of an LCD module of the invention.

In the example, the upper end surface of the vertical wall 52 of the backplane is provided with a convex lug 53, the root width of the convex lug 53 is less than that of the top width of the convex lug, the vertical wall 12 of the front frame is correspondingly provided with a notch 13 matched with the convex lug 53, the mouth width of the notch 13 is less than the bottom width of the notch, and the convex lug 53 is fixed in the notch 13, thereby fixing the backplane 5 and the front frame 1. The middle frame 3 is respectively and mutually in contact with the front frame 1 and the backplane 5, thereby preventing the horizontal movement between the front frame 1 and the backplane 5. Because the conventional front frame, middle frame and backplane are assembled and then tightened by clamping hooks or screws on the side face, all these fixed structures can add the frame width of the LCD module; because the front frame 1 and the backplane 5 of the invention are fixed and connected by the connecting structures on the vertical walls, the frame width of the LCD module cannot be added.

In the example, the lower end surface of the vertical wall of the front frame is provided with a convex lug, the root width of the convex lug is less than that of the top width of the convex lug, the vertical wall of the backplane is correspondingly provided with a notch matched with the convex lug, the mouth width of the notch is less than the bottom width of the notch, and the convex lug is fixed in the notch, thereby fixing the backplane and the front frame. In the scheme, only by simply exchanging the position of the convex lug with that of the notch, the same aim of the invention can be achieved, and the same advantages can be obtained.

Figure 6:
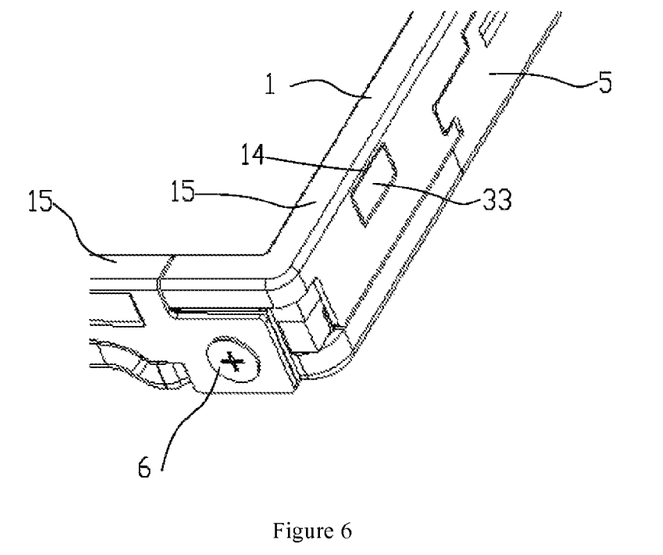
FIG. 6 is a structure diagram of a connecting structure of a front frame and a middle frame of a first example of an LCD module of the invention.
Figure 7:
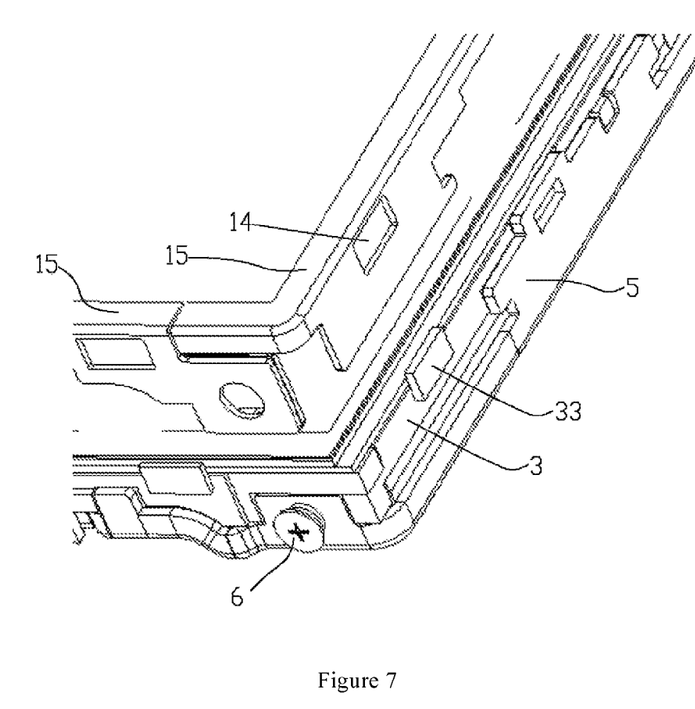
FIG. 7 is a disassembly diagram of a connecting structure of a front frame and a middle frame of a first example of an LCD module of the invention.

In the example, the outer wall of the vertical wall 32 of middle frame is provided with a protrusion 33, the vertical wall 12 of the front frame is correspondingly provided with a through hole 14, and the protrusion 33 is fixed in the through hole 14. Thus, the middle frame 3 is integratedly connected with the front frame 1, thereby increasing the overall strength of the LCD module.

Figure 8:
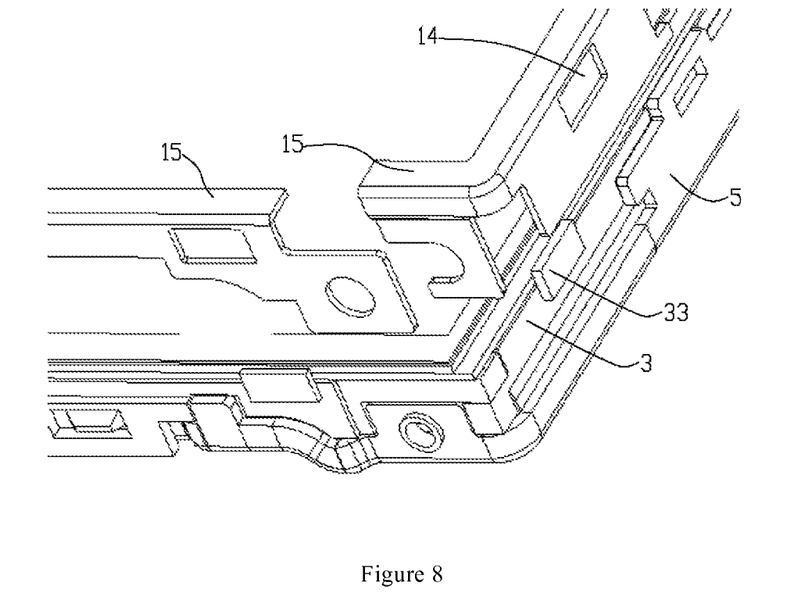
FIG. 8 is a disassembly diagram of a front frame of a first example of an LCD module of the invention.

In the example, because the protrusion 33 of the vertical wall 32 of the middle frame should be inserted in the through hole 14 of the front frame 1, to facilitate the assembly of the front frame 1, the front frame 1 is specially designed into a separate structure, and is joined by four frame edge members 15. The vertical wall at the joint of two adjacent frame edge members is provided with a through hole, the screw 6 used for fixing penetrates through the through hole and then fixes the adjacent frame edge members 15. Thus, the assembling efficiency is increased. In addition, of the through holes in the vertical walls at each joint of the adjacent frame members, the outside through hole is of a closed structure, and the inside through hole is of an open structure, specifically, a U-shaped structure in the example. The matching mode enables the frame edge members to be easily assembled, and the assembling problem of the frame edge members caused by manufacturing tolerance to be eliminated.

Figure 9:
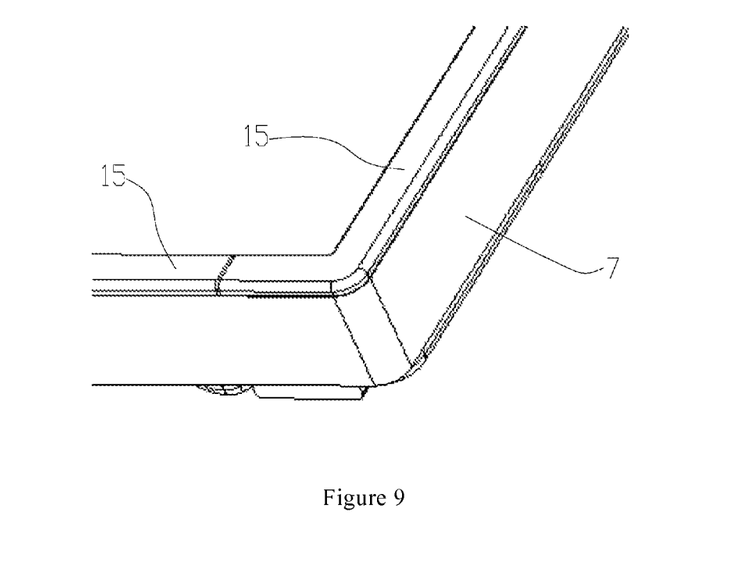
FIG. 9 is a schematic diagram of an LCD module with a reinforcing adhesive tape on a side face of a first example of the invention.

In the example, after the front frame 1, the middle frame 3 and the backplane 5 are assembled, and the side face of the LCD module is wound with a circle of reinforcing adhesive tape 7, thereby further increasing the overall strength of the LCD module.

In the example, the front frame can only comprise the vertical wall without comprising the horizontal wall. The LCD panel is matched and fixed to the front frame or the middle frame by the side face or the bottom structure, such as sticking by glue is also feasible.

In the example, the vertical wall of the middle frame is aligned with the vertical wall of the backplane, or the vertical wall of the middle frame is only partially overlapped with the vertical wall of the backplane. Thus, the frame can be further narrowed.

Figure 10:
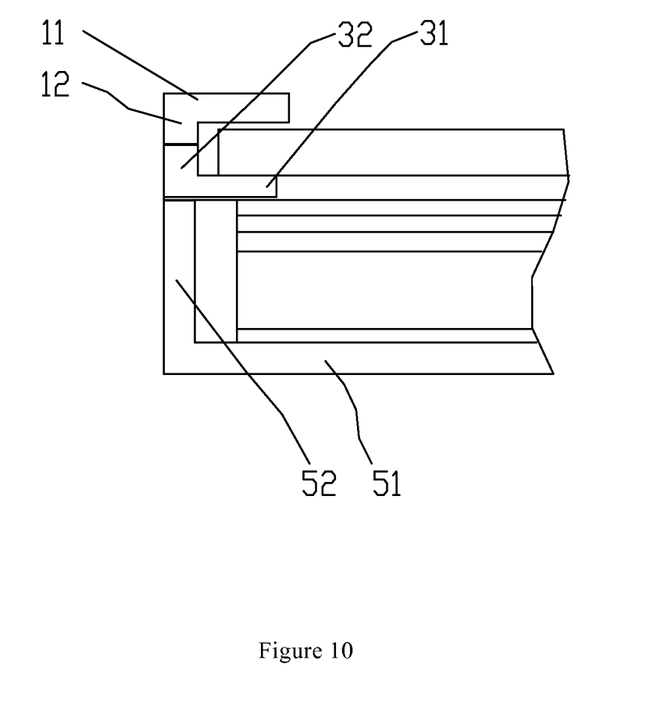
FIG. 10 is an assembly diagram of a second example of an LCD module of the invention.

FIG. 10 shows a second example of the LCD module of the invention. The middle frame 3 of the LCD module comprises a horizontal wall 31, and a vertical wall 32. The vertical wall 12 of front frame 1 is not only vertically aligned with the vertical wall 52 of the backplane, but also vertically aligned with the vertical wall 32 of the middle frame. In the example, the connection mode between the front frame and the backplane, or the front frame and the middle frame is the same as that of the first example, the example will not give unnecessary details.

In the LCD module of the invention, because the vertical wall 12 of the front frame is vertically aligned with the vertical wall 32 of the middle frame, and also vertically aligned with the vertical wall 52 of the backplane, the single edge of the frame of the LCD module is narrowed by a thickness of the vertical wall of the middle frame on the basis of being narrowed by a wall thickness of the front frame or the backplane, thereby obtaining an LCD module with a narrower frame.

The invention is described in detail in accordance with the above contents with the specific preferred examples. However, this invention is not limited to the specific examples. For the ordinary technical personnel of the technical field of the invention, on the premise of keeping the conception of the invention, the technical personnel can also make simple deductions or replacements, and all of which should be considered to belong to the protection scope of the invention.

We claim:

1. An LCD module, comprising: a front frame, and a backplane; wherein said front frame comprises a vertical wall, and said backplane comprises a horizontal wall, and a vertical wall; the vertical wall of said front frame is vertically aligned with the vertical wall of said backplane; said LCD module further comprises a middle frame; said middle frame comprises a horizontal wall, and a vertical wall; the vertical wall of said middle frame is positioned inside the vertical walls of said front frame and said backplane; the upper end surface of the vertical wall of said backplane is provided with a convex lug, the root width of said convex lug is less than the top width of said convex lug, the vertical wall of said front frame is correspondingly provided with a notch matched with said convex lug, the mouth width of said notch is less than the bottom width of said notch, and said convex lug is fixed in said notch, thereby fixing said backplane and said front frame; the outer wall of the vertical wall of said middle frame is provided with a protrusion; the vertical wall of said front frame is correspondingly provided with a through hole, and said protrusion is fixed in said through hole; said front frame is of a separate structure, and is joined by four frame edge members; the vertical wall at the joint of two adjacent frame edge members is provided with a through hole, and a screw used for fixing penetrates through said through hole and fixes adjacent frame edge members; of said through holes in the vertical walls at each joint of said adjacent frame members, the outside through hole is of a closed structure, and the inside through hole is of an open U-shaped structure; the side face of said LCD module is further provided with a reinforcing adhesive tape.

2. An LCD module, comprising: a front frame, and a backplane; wherein said front frame comprises a vertical wall, and said backplane comprises a horizontal wall, and a vertical wall; the vertical wall of said front frame is vertically aligned with the vertical wall of said backplane.

3. The LCD module of claim 2, wherein said LCD module further comprises a middle frame; said middle frame comprises a horizontal wall, and a vertical wall; the vertical wall of said middle frame is positioned inside the vertical walls of said front frame and said backplane.

4. The LCD module of claim 2, wherein said LCD module further comprises a middle frame; said middle frame comprises a horizontal wall, and a vertical wall; the vertical wall of said front frame is vertically aligned with the vertical wall of said middle frame.

5. The LCD module of claim 2, wherein the upper end surface of the vertical wall of said backplane is provided with a convex lug, the root width of said convex lug is less than that of the top width of said convex lug, the vertical wall of said front frame is correspondingly provided with a notch matched with said convex lug, the mouth width of said notch is less than the bottom width of said notch, and said convex lug is fixed in said notch, thereby fixing said backplane and said front frame.

6. The LCD module of claim 2, wherein the lower end surface of the vertical wall of said front frame is provided with a convex lug, the root width of said convex lug is less than that of the top width of said convex lug, the vertical wall of said backplane is correspondingly provided with a notch matched with said convex lug, the mouth width of said notch is less than the bottom width of said notch, and said convex lug is fixed in said notch, thereby fixing said backplane and said front frame.

7. The LCD module of claim 3, wherein the outer wall of the vertical wall of said middle frame is provided with a protrusion, the vertical wall of said front frame is correspondingly provided with a through hole, and said protrusion is fixed in said through hole.

8. The LCD module of claim 7, wherein said front frame is of a separate structure, and is joined by four frame edge members.

9. The LCD module of claim 8, wherein the vertical wall at the joint of said adjacent frame edge members is provided with a through hole, and a screw used for fixing penetrates through said through hole and then fixes said adjacent frame members; of said through holes in the vertical walls at each joint of said adjacent frame members, the outside through hole is of a closed structure, and the inside through hole is of an open U-shaped structure.

10. The LCD module of claim 8, wherein the side face of said LCD module is further provided with a reinforcing adhesive tape.

11. An LCD device, comprising: an LCD module; wherein said LCD module comprises a front frame, and a backplane; said front frame comprises a vertical wall, and said the backplane comprises a horizontal wall, and a vertical wall; wherein the vertical wall of said front frame is vertically aligned with the vertical wall of said backplane.

12. The LCD device of claim 11, wherein said LCD module further comprises a middle frame; said middle frame comprises a horizontal wall, and a vertical wall; the vertical wall of said middle frame is positioned inside the vertical walls of said front frame and said backplane.

13. The LCD device of claim 11, wherein said LCD module further comprises a middle frame; said middle frame comprises a horizontal wall, and a vertical wall; the vertical wall of said front frame is vertically aligned with the vertical wall of said middle frame.

14. The LCD device of claim 11, wherein the upper end surface of the vertical wall of said backplane is provided with a convex lug, the root width of said convex lug is less than that of the top width of said convex lug, the vertical wall of said front frame is correspondingly provided with a notch matched with said convex lug, the mouth width of said notch is less than the bottom width of said notch, and said convex lug is fixed in said notch, thereby fixing said backplane to said front frame.

15. The LCD device of claim 11, wherein the lower end surface of the vertical wall of said backplane is provided with a convex lug, the root width of said convex lug is less than that of the top width of said convex lug, the vertical wall of said backplane is correspondingly provided with a notch matched with said convex lug, the mouth width of said notch is less than the bottom width of said notch, and said convex lug is fixed in said notch, thereby fixing said backplane and said front frame.

16. The LCD device of claim 12, wherein the outer wall of the vertical wall of said middle frame is provided with a protrusion, the vertical wall of said front frame is correspondingly provided with a through hole, and said protrusion is fixed in said through hole.

17. The LCD device of claim 16, wherein said front frame is of a separate structure, and is joined by four frame edge members.

18. The LCD device of claim 17, the vertical wall at the joint of adjacent frame edge members is provided with a through hole, a screw used for fixing penetrates through said through hole and then fixes said frame members; of said through holes in the vertical walls at each joint of said adjacent frame members, the outside through hole is of a closed structure, and the inside through hole is of an open U-shaped structure.

19. The LCD device of claim 17, wherein the side face of said LCD module is further provided with a reinforcing adhesive tape.

* * * * *